Patented July 19, 1949

2,476,819

UNITED STATES PATENT OFFICE 2,476,819

METHOD OF PRODUCING GR-S LATEX CONTAINING CARBON BLACK

Rexford E. Draman, Akron, Ohio, assignor to The Firestone Tire & Rubber Company, Akron, Ohio, a corporation of Ohio No Drawing. Application April 30, 1945,
Serial No. 591,229

1 Claim. (Cl. 260—23.7)

This invention relates to producing a synthetic latex by polymerizing in the presence of carbon black. More particularly, it relates to such a process in which a hydrocarbon-soluble catalyst is employed to counteract, at least in part, the retarding effect of the carbon black on the polymerization reaction. Preferably, the hydrocarbon-soluble catalyst is used in conjunction with a water-soluble catalyst. The invention includes the new latex as well as the process of producing it.

In view of the difficulty experienced in milling carbon black and other pigments into synthetic rubbers, considerable work has been done toward incorporating the black at some earlier stage of the procedure. No one has heretofore successfully polymerized one or more monomers in the presence of suspended carbon-black particles to produce a latex of a synthetic rubber in which the black particles are embedded in the suspended particles of the synthetic rubber. According to this invention carbon black is incorporated in a synthetic latex in this manner, and in a preferred form of the invention the polymerization is carried out in the presence of a hydrocarbon-soluble catalyst in conjunction with a water-soluble catalyst. The effect of the catalysts is to offset or counteract the retarding action of the carbon-black particles on the polymerization reaction. The hydrocarbon-soluble catalyst may be acrylonitrile, methyl vinyl ketone, benzoyl peroxide, tertiary butyl hydroperoxide or the like. The water-soluble catalysts are of the type now employed in emulsion polymerizations, for example, hydrogen peroxide, potassium persulfate, other metallic peroxides, other salts of persulfuric acid, perborates, etc.

Although the invention presently has more potential value in the polymerization of butadiene and styrene to produce a latex such as the well-known GR-S latex, the invention is applicable also to the other polymerizations which yield rubber-like latices as, for example, in the copolymerization of butadiene and acrylonitrile, etc. In the latter reaction acrylonitrile, of course, is not used as a catalyst although any other hydrocarbon-soluble catalyst may be employed.

The amount of black which may be incorporated according to this procedure will vary. Ordinarily, not less than 5 parts nor more than 25 parts of black, by weight, per 100 parts of the intended polymer will be added to the reaction mixture prior to or during the polymerization. If further black is to be added to the rubber, it will ordinarily be advantageous to do this after the polymerization has been completed as by adding the black to the latex or milling it into the coagulum.

EXAMPLE

The process is preferably carried out by producing separate suspensions of the black and the monomer or monomers to be polymerized and then mixing. The formula, therefore, may be divided into two parts which refer, respectively, to the black suspension and the monomer suspension. The following is illustrative:

PART I

Black suspension

| Ingredients | Parts by Weight |
| --- | --- |
| Carbon black | 111.2 |
| Soap | 13.4 |
| Water | 321.6 |
| Sulfonated tall-oil | 54.6 |
| NH₄OH | 9.0 |

PART II

Monomer suspension

| Ingredients | Parts by Weight |
| --- | --- |
| Water | 889.0 |
| Soap | 37.0 |
| Potassium persulfate | 3.0 |
| Styrene | 250.0 |
| Modifier | 10.0 |
| Catalyst | 1.33 |
| Butadiene | 750.0 |

The black employed may be any amorphous black. The soap is preferably sodium stearate, sodium oleate or the like. Instead of sulfonated tall oil any suitable dispersing agent may be employed. The modifier is lauryl mercaptan or any other suitable material. The catalyst is preferably tertiary butyl hydroperoxide. Although in the formula the styrene and butadiene are used in the ratio of 1:3, other ratios, such as 1:2, 2:3, and the other ratios employed in producing rubber-like copolymers, may be employed. Other polymers may be added or may, in part, replace the polymers above referred to.

In preparing the carbon-black suspensoid, the materials were added in the following order: water, soap, dispersing agent, ammonium hydroxide, and carbon black. The black went into suspension very easily, and after fifteen minutes' agitation a very smooth emulsion was obtained.

In producing the emulsion for polymerization, the ingredients were added to the reaction vessel in the following order: black suspensoid, soap solution and potassium persulfate, styrene, modifier and catalyst, and butadiene. The tertiary butyl hydroperoxide was dissolved in the lauryl mercaptan, and the two were added together.

An agitator was run in the reaction vessel during the addition of the black suspensoid, and the addition of the soap and catalyst. The soap and persulfate may be added together or separately. The agitator was turned off during the charging of the hydrocarbons but was started up again after the charging of the batch was completed. The reaction proceeded more slowly than a batch containing no black but otherwise progressed uneventfully. At the end of about 20 hours 43 per cent total solids (75 per cent conversion) had been reached. The reaction temperature was maintained at 125° F. for about 19 hours and was then raised to 135° F. to increase the slowing reaction rate. The latex showed no evidence of precoagulation or of carbon precipitation. It was quite viscous due to the high solids content.

After the polymerization was completed, the reaction mass was passed through the standard recovery equipment employed with GR-S reactions, and the recovery of unreacted monomers was rapid with less foaming than is usually encountered. Coagulation was accomplished in the usual manner with 2 per cent aluminum sulfate. The mother liquor was water white, indicating that the carbon black was embedded in the coagulum. The coagulum was filtered and dried without difficulty.

Test samples were prepared according to the following formula:

| | Parts by weight |
|---|---|
| GR-S | 100 |
| Channel black | 50 |
| Softener | 5 |
| Zinc oxide | 5 |
| Sulfur | 5 |
| Mercaptobenzothiazole | 2.5 |

Fifteen parts of the tabulated 50 parts of carbon black were charged to the reactor and thus incorporated in the latex on polymerization, and the remaining 35 parts were added on the mill. The softener employed was a coal-tar product. The product was cured at 292° F. and tested as follows:

Per cent elongation:
- 25' — 785
- 50' — 650
- 90' — 560

300% modulus:
- 25' — 350
- 50' — 825
- 90' — 1050

400% modulus:
- 25' — 500
- 50' — 1250
- 90' — 1650

500% modulus:
- 25' — 800
- 50' — 1725
- 90' — 2335

Tensile:
- 25' — 1575
- 50' — 2490
- 90' — 2865

To determine the amount of catalyst to be used and whether a mixture of the hydrocarbon-soluble catalyst and water-soluble catalyst was better than either alone, two series of tests were run. The test bottles in each test were charged with identical components and treated identically for 16 hours at 122° F. The results of the two tests are not directly comparable but show the trend:

| | Parts $K_2S_2O_8$ | Parts T. B. H. | Per Cent Conversion |
|---|---|---|---|
| First Test | 0.3 | 0.0 | 59 |
| | 0.0 | 0.0666 | 79 |
| | 0.0 | 0.2 | 99 |
| | 0.0 | 0.333 | 100 |
| Second Test | 0.3 | 0.0 | 49.5 |
| | 0.3 | 0.066 | 79 |
| | 0.3 | 0.134 | 93.5 |
| | 0.3 | 0.333 | 93 |

(In the table T. B. H. stands for tertiary butyl hydroperoxide.) The results show that although the hydrocarbon-soluble catalyst alone gives a high conversion, its use with a water-soluble catalyst is preferred.

The presence of carbon black during a polymerization retards the rate of polymerization very appreciably. Attempts to counteract this by adding additional persulfate caused precoagulation of the latex. The hydrocarbon-soluble catalysts of this invention are, apparently, not adsorbed by the carbon black in the manner that water-soluble catalysts are; and the invention, therefore, lies in part in using such a hydrocarbon-soluble catalyst. The water-soluble catalyst may be omitted altogether. The preferred form of the invention contemplates the use of a mixture of the two types of catalyst.

The water-soluble iron activators or kickers often used in ordinary polymerizations instead of the persulfate of the above formula cannot ordinarily be employed in the presence of carbon black.

The illustrations are not intended to limit the scope of this invention which is defined by the appended claim.

What I claim is:

The process of producing a latex of rubber-like copolymer of butadiene and styrene containing 5 to 25 parts of carbon black per 100 parts of copolymer which comprises producing an aqueous suspension of the carbon black with a small amount of sodium-fatty-acid soap, sulfonated tall oil and ammonia; adding with agitation a small amount of sodium-fatty-acid soap and potassium-persulfate catalyst; then without agitation adding the styrene, the butadiene, and small amounts of lauryl-mercaptan modifier and tertiary-butyl-hydroperoxide catalyst, resuming agitation thereafter, and keeping the reaction mixture at a temperature of about 125° F. until the reaction slows down and then raising the temperature to 135° F.

REXFORD E. DRAMAN.

REFERENCES CITED

The following references are of record in the file of this patent:

UNITED STATES PATENTS

| Number | Name | Date |
|---|---|---|
| 1,911,672 | Bock et al. | May 30, 1933 |
| 2,367,805 | Semple | Jan. 23, 1945 |
| 2,394,025 | Te Grotenhuis | Feb. 5, 1946 |
| 2,401,346 | Fryling | June 4, 1946 |
| 2,430,590 | Stewart | Nov. 11, 1947 |

OTHER REFERENCES

Pages 577 to 582, The Rubber Age, Sept. 1944. (Copy in Div. 50.)

Pages 735 to 738, Industrial and Engineering Chemistry, Aug. 1944. (Copy in Div. 50.)

Certificate of Correction

Patent No. 2,476,819                                                  July 19, 1949

REXFORD E. DRAMAN

It is hereby certified that error appears in the printed specification of the above numbered patent requiring correction as follows:

Column 3, line 46, for the word "product" read *mix*;

and that the said Letters Patent should be read with this correction therein that the same may conform to the record of the case in the Patent Office.

Signed and sealed this 31st day of January, A. D. 1950.

[SEAL]

THOMAS F. MURPHY,
*Assistant Commissioner of Patents.*